United States Patent [19]

Reindl

[11] Patent Number: 4,867,400
[45] Date of Patent: Sep. 19, 1989

[54] PLASTICS RETAINING CLIP

[75] Inventor: Johan Reindl, Biebertal, Fed. Rep. of Germany

[73] Assignee: Emhart Industries, Inc., Farmington, Conn.

[21] Appl. No.: 225,110

[22] Filed: Jul. 27, 1988

[30] Foreign Application Priority Data

Jul. 28, 1987 [DE] Fed. Rep. of Germany ....... 8710356

[51] Int. Cl.$^4$ .............................................. F16L 3/22
[52] U.S. Cl. .................................... 248/68.1; 248/74.2
[58] Field of Search ..................... 248/68.1, 500, 74.2, 248/74.4, 65

[56] References Cited

U.S. PATENT DOCUMENTS

| | | |
|---|---|---|
| 2,727,220 | 12/1955 | Buchanan et al. ............... 248/500 X |
| 3,246,440 | 4/1966 | Meyer . |
| 3,455,528 | 7/1969 | Meyer . |
| 4,358,080 | 11/1982 | Wolker . |
| 4,450,605 | 5/1984 | Schaty . |
| 4,467,987 | 8/1984 | Small . |
| 4,467,988 | 8/1984 | Kraus ................................. 248/68.1 |
| 4,550,891 | 11/1985 | Schaty ................................ 248/68.1 |

FOREIGN PATENT DOCUMENTS 3238345 4/1984 Fed. Rep. of Germany .

Primary Examiner—Alvin C. Chin-Shue
Attorney, Agent, or Firm—Spencer T. Smith

[57] ABSTRACT

A plastics retaining clip for clamping e.g. brake lines to a stay bolt of a motor vehicle of the kind disclosed in German DE-OS 32 38 345 characterized by projections which protrude into the bore for housing the stay bolt, the number of the projections corresponding with the number of gripping jaws, the projections and the gripping jaws having the same angular disposition with reference to the center axis of the bore, the width of the projections being at least equal to the width of the relevant gripping jaws, and the projections at their edge which butts against the stay bolt and points in the direction of underside of the retaining clip, are formed with sharp edges. Thus when the clip is mounted on a bolt treated with underseal material, the sharp edges remove a modicum of underseal material from the stud which enables the clip to be seated securely on the stud.

5 Claims, 1 Drawing Sheet

U.S. Patent  Sep. 19, 1989  4,867,400
FIG. 1
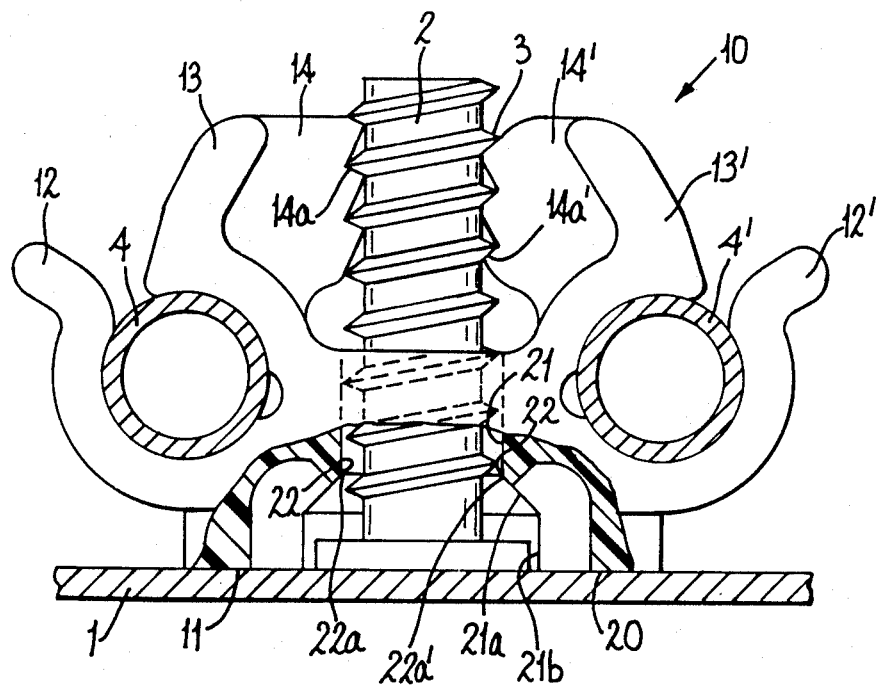
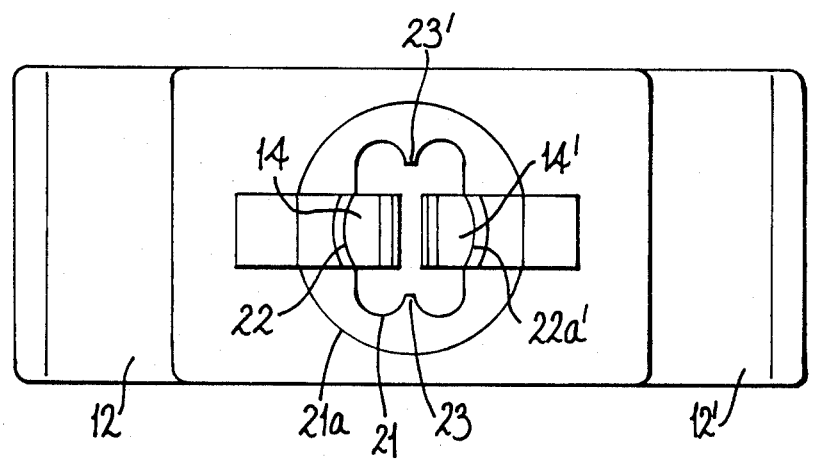
FIG. 2

PLASTICS RETAINING CLIP

BACKGROUND OF THE INVENTION

The present invention relates to a plastic retaining clip for clamping components, particularly brake lines, to motor vehicles onto a stay bolt on the vehicle, provided with circular ridges, which is welded to a supporting plate, wherein the retaining clip comprises a base body, which is provided with a bore for housing the stay bolt and of which the underside butts against the supporting plate when the retaining clip is pressed onto the stay bolt, wherein the retaining clip further comprises clamping means designed integrally with the base body and which grip the components, and wherein the retaining clip further comprises at least two resilient gripping jaws provided with notches which are connected in one piece to the base body and/or the clamping means, these gripping jaws being disposed substantially at the same angular distance around the centre axis of the bore of the base body and the distance of the gripping jaws from each other being less than the diameter of the stay bolt, so that after the insertion of the stay bolt the gripping jaws with their notches engage the ridges of the stay bolt because of their resilient recovery.

Such a retaining clip is described in German specification DE-OS No. 32 38 345. With this known retaining clip brake lines of motor vehicles can be secured in an advantageous way to a stud. The mounting of this known retaining clip can, however, give rise to problems if the brake lines are fitted, as is usual, to the underside of the vehicle, and if this underside of the motor vehicle is treated with an undersealing agent.

The undersides of motor vehicles are nowadays often treated with a protective coating consisting of a relatively pliant, tough tar-like material as protection against corrosion. Since on the one hand the studs can be welded only to the rough automobile body and on the other hand brake lines must not be covered by undersealing agent, the brake lines can only be fitted after the undersealing agent has been applied to the underside of the vehicle provided with the stud.

If the known retaining clip is mounted on a stud coated with undersealing agent, then some of the underseal is scraped off the stud and becomes jammed between the underside of the stud and the surface onto which the stud is welded. The retaining clip cannot then achieve its intended final position. More importantly however, a substantial portion of the pliant, tough undersealing agent is left behind on the stud itself. A a result, the notches of the gripping jaws are prevented from fully engaging the circular ridges of the stud. Thus there is the risk of the retaining clip slipping off the stud when exposed to traffic conditions, and this can even put the braking system of the motor vehicle out of action.

A further problem arises from the fact that the fitting of the retaining clips is carried out automatically by means of hand-operated automatic appliances which cannot recognise a possible faulty assembly.

German gebrauchsmuster No. DE-GM 84 17 558 discloses a collar nut of plastics for turning onto a stud provided with a thread. This collar nut is provided with projections which scrape off the undersealing agent adhering to the stud during the screwing-on of the collar nut. This collar nut does, however, necessitate the use of a threaded stud and thus the turning of the nut when being mounted. The retaining clips of the kind described in No. DE-OS 32 38 345 do not, however, require any turning motion during assembly, since the brake lines are mounted in the clamping means of the retaining clip before assembly and this determines the angular position of the retaining clip with regard to the studs.

The object of the invention is to provide a plastics retaining clip of the kind set out in No. DE-OS 32 38 345 which can be mounted securely onto a stud covered with undersealing agent.

BRIEF DESCRIPTION OF THE INVENTION

According to the present invention, such a plastics retaining clip is characterised in that the base body comprises projections, which protrude into the bore for housing the stay bolt, the number of the projections corresponding with the number of gripping jaws, the projections and the gripping jaws having the same angular disposition with reference to the centre axis of the bore, the width of the projections being at least equal to the width of the relevant gripping jaws, and the projections at their edge, which butts against the stay bolt and points in the direction of underside of the retaining clip, are formed with sharp edges.

When a retaining clip in accordance with the present invention is pressed onto a stud covered with undersealing agent, the latter is scraped off by the projections in the longitudinal direction of the stud. The removal of the undersealing agent is made easier because the projections are formed with sharp edges at their edge pointing towards the underside of the retaining clip. Since the angular position of the projections corresponds with the angular position of the arrangement of the gripping jaws and, further the width of the projections is matched with the width of the gripping jaws, the undersealing agent is removed from those places against which the gripping jaws ultimately rest in their final position. This ensures that under defined conditions the notches engage the ridges of the stud, and a performance-reliable construction of the retaining clip is made possible which positively prevents the retaining clip accidentally slipping off from the stud.

Unlike the clip disclosed in No. DE-GM 84 17 558, the retaining clip in accordance with the present invention does not remove the undersealing agent entirely from the stud. Removal of the undersealing agent takes place only in the areas of the circumference of the stud against which the gripping jaws rest. This produces the great advantage that only the materials scraped-off by the projections can get between the retaining clip and the supporting plate.

In order that scraped-off material should not reduce cohesion, a retaining clip in accordance with a preferred embodiment of the invention is provided on its underside with a recess surrounding the bore. In this recess material that is scraped off can be accommodated, thus ensuring that the retaining clip can achieve its final position when being mounted.

According to a further preferred embodiment, the bore of the base body is oval in shape. This creates an open space between the stud and the bore of the base body for the purpose of accommodating removed undersealing material. This additionally reduces the risk of the undersealing material getting between the supporting plate and the underside of the retaining clip.

In yet another preferred embodiment the plastics retaining clip in accordance with the invention, the retaining clip is provided with two gripping jaws staggered at 180° and a substantially oval bore is used. On this specific embodiment small webs are provided projecting into the bore, which are staggered at 90° in relation to the projections and which are designed so that they butt against the stud in the assembled position. By means of these webs the retaining clip is supported against any possible tilting when only two projections are used. It is to be noted that only small webs are used, which scrape off only relative little undersealing material in the course of the pressing on. The amount of the undersealing material removed in the course of the pressing on is consequently not substantially increased.

BRIEF DESCRIPTION OF THE DRAWINGS

In order that our invention may be better understood, a preferred embodiment will now be described in greater detail by way of example and with reference to the accompanying drawings in which:

FIG. 1 is a side view of a plastics retaining clip in accordance with the invention—drawn partially in section—in the assembled state; and FIG. 2 is an underside view of the retaining clip according to FIG. 1.

DETAILED DESCRIPTION OF THE DRAWINGS AND PREFERRED EMBODIMENT

In FIG. 1 an underside plate of a motor vehicle constitutes the supporting plate 1, onto which a stud 2 is securely welded. The stud is provided with circular ridges 3. The illustrative retaining clip serves the purpose of securing brake lines 4 and 4′, shown in section lines, to this stud.

Retaining clip 10 comprises base body 11, clamping means 12,13 and 12′ and 13′ and gripping jaws 14,14′. The base body 11 rests on the supporting plate 1 of the automobile-body sheet iron. Inside the base body is provided a bore 21, which extends into the entrance region 21a, this extension being followed by a recess 21b, the surface line of which is parallel with the axis of the bore.

The bore, as can best be seen in FIG. 2, is not circular, but substantially oval in shape. On two sides of the bore, at angular positions corresponding with the position of the gripping jaws 14,14′, are arranged projections 22,22′. The projections at their forward edge 22a are formed with sharp-edges. Furthermore, small webs 23,23′ are provided inside the bore which prevent angular movements of the retaining clip in a direction perpendicular with the plane in which the gripping jaws 14,14′ are disposed.

The form of the clamping means 12,13 and/or 12′,13′ is known from the prior art and is therefore not described in further detail.

The assembly of this retaining clip is carried out as follows:

The brake lines are inserted into the clamping means 12,13 or 12′,13′ before the assembly of the retaining clip in a customary way. Then the retaining clip is pressed onto a stud either by hand or by means of a hand-operated automatic tool, the stud being covered with undersealing agent from a preceding underbody treatment. The retaining clip is first placed onto the stud, centering being made easier by conical entrance region 21a of the bore 21, and is then pressed in the axial direction of the stud onto the latter. During the pressing-on movement, which is effected without the retaining clip being turned, the sharp edges of projections 22,22′ scrape off from the stud a strip of undersealing material at each side of the stud. The scraped-off undersealing material is taken up by the conical entrance regions 21a, the cylindrical recess 21b and by the cavities of the base body left between projections 22,22′ and webs 23,23′ and may possibly be dislodged completely from the region of the base body. The gripping jaws 14,14′ spring back during the pressing-on and bear on the stud in the region of the stud freed from undersealing material by the scraping action of the projections. This makes possible a definite engagement of notches 14a,14a′ into the stud and thus provides reliable retentive effectiveness of the retaining clip.

I claim:

1. Plastics retaining clip for clamping components, particularly brakelines, to motor vehicles, onto a stay bolt on the vehicle, wherein said stay bolt is provided with circular ridges and is welded to a supporting plate, wherein the retaining clip comprises a base body, which is provided with a bore for housing the stay bolt and of which the underside butts against the supporting plate when the retaining clip is pressed onto the stay bolt, wherein the retaining clip further comprises clamping means designed integrally with the base body and which grip the brake line components, and wherein the retaining clip further comprises at least two resilient gripping jaws provided with notches which are connected in one piece to the base body and/or the clamping means, these gripping jaws being disposed opposite each other and the distance of the gripping jaws from each other being less than the diameter of the stay bolt, so that after the insertion of the stay bolt the gripping jaws with their notches engage the circular ridges of the stay bolt because of their resilient recovery, characterized in that the base body comprises projections, which protrude into the bore for housing the stay bolt and which are formed with sharp edges, which edges are perpendicular to the axis of the stay bolt and are adapted to scrape undersealing agent off said stay bolt, the number of the projections corresponding with the number of gripping jaws, the projections and the gripping jaws being axially aligned and the projections being located below the relevant gripping jaws, the width of the projections being at least equal to the width of the relevant gripping jaws, and the sharp edges of the projections butt against the stay bolt and point in the direction of the underside of the retaining clip.

2. Plastics retaining clip according to claim 1, wherein the base body has a recess surrounding the bore.

3. Plastics retaining clip according to claim 1, wherein the bore of the base body is oval in shape.

4. Plastics retaining clip according to claim 1, wherein the retaining clip has two gripping jaws staggered at 180° and two appropriately disposed projections, and that two small webs are provided projecting into the bore, and are staggered at 90° in relation to projections and which extend parallel with the axis of the bore, thus preventing tilting of the bolt during pressing on.

5. Plastics retaining clip according to claim 1, wherein the bore of the base body is oval in shape and wherein the retaining clip has two gripping jaws staggered at 180° and two appropriately disposed projections, and that two small webs are provided projecting into the bore, and are staggered at 90° in relation to projections and which extend parallel with the axis of the bore, thus preventing tilting of the bolt during pressing on.

* * * * *